United States Patent [19]

Young et al.

[11] 4,387,857
[45] Jun. 14, 1983

[54] GRINDER-MIXER CONTROLS

[75] Inventors: Terry A. Young, Lititz; William W. Mann, Leola; Charles M. Kline, Reinholds; Ernest A. Schoeneberger, New Holland, all of Pa.

[73] Assignee: Sperry Corporation, New Holland, Pa.

[21] Appl. No.: 225,068

[22] Filed: Jan. 14, 1981

[51] Int. Cl.³ ............................................. B02C 25/00
[52] U.S. Cl. .............................. 241/101 B; 241/101.7
[58] Field of Search ............... 406/39, 41, 42, 166; 366/603, 186; 414/469, 470; 241/101.7, 101 B, 241/30

[56] References Cited

U.S. PATENT DOCUMENTS 3,133,727 5/1964 Luscombe .................. 241/101 B X

Primary Examiner—Mark Rosenbaum

[57] ABSTRACT

Remote control of unloading augers on agricultural grinder-mixers is accomplished by hydraulic motors arranged to adjust the height of the remote end of the auger and to rotate its position in the horizontal plane. These motors are each controlled by solenoid operated valves in the hydraulic system and the valves are operated by sets of electrical controls located in the tractor cab and in proximity to the unloading auger.

4 Claims, 2 Drawing Figures

GRINDER-MIXER CONTROLS

BACKGROUND OF THE INVENTION

This invention deals generally with farm implements and more specifically with a remote control system for the unloading systems of portable grinder-mixers.

A portable grinder-mixer is a specialized farm implement for onsite processing of crop material into livestock feed. Its essential components are a wheel mounted tank with mixing augers, a grinding mill, a loading apparatus and an unloading system. Power is generally supplied by means of a mechanical power take off attachment to the tractor which is used to pull the grinder-mixer.

The unloading system with which this invention deals is an unloading auger which consists of a powered screw auger up to twenty feet long. The unloading auger is both adjustable in its angle to the horizontal and rotatable in the horizontal plane, to permit easy reach to the top of high bins or over fences. Essentially, the unloading auger is anchored at one end to the frame of the grinder-mixer where it is fed by a short, fixed position discharge auger which transports the feed from the tank. The unloading auger generally is used to raise the feed into storage bins, but accessories are available for other purposes, such as bagging the produced feed.

The positioning of unloading augers had previously been accomplished by the use of hand winches for lifting the remote end and simple pulling and tugging to locate the auger in the horizontal plane. More recently hydraulic motors have been substituted for shear brute force to vary the location of the discharge end of the unloading auger. However, the location of the controls and the single control concept have remained unchanged.

Whereas previously the operator was required to leave the tractor and manually orient the unloading auger. The addition of motors still requires him to leave the tractor to manipulate the controls. This operation is limited by being time consuming, strenuous and undesirably inconvenient.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing controls for grinder-mixers including remote control of an unloading auger on the grinder-mixer. Control is provided at preferably two control stations. Each station includes controls which are electrically and hydraulically connected to activate horizontal and vertical movement of the auger.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DETAILED DESCRIPTION OF THE INVENTION

Figure 1:
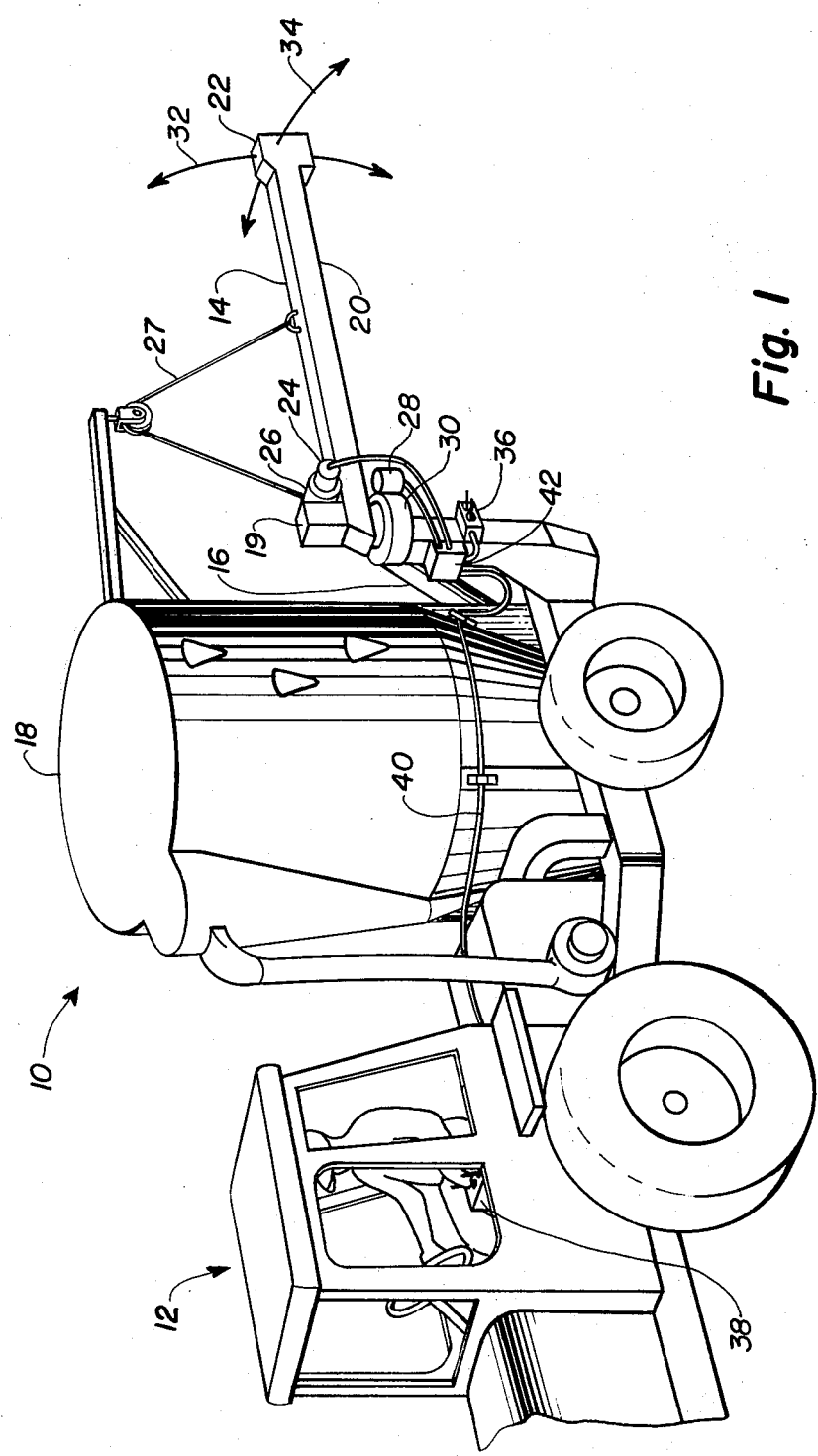
FIG. 1 is a perspective view illustrating an embodiment of a typical grinder-mixer and the tractor showing the preferred locations of the two remote control stations.

FIG. 1 is a view of a typical portable grinder-mixer 10 with an unloading auger 14 fed by a discharge auger 16 and an associated power source such as a towing tractor 12. Discharge auger 16 removes feed from the bottom of a tank 18 and lifts the feed to an input end 19 of unloading auger 14 where it is transported by an auger trough 20 to an end cap 22 where it is discharged into a selected storage device (not shown). Adjustment of the location of auger trough 20 is accomplished by means of a motor 24 for vertical movement with an associated winch 26 and cables 27 and a horizontal motor 28 for horizontal movement with an associated gear mechanism 30. Vertical motor 24 moves auger trough 20 in a vertical arcuate path as indicated by the arrow designated 32, while horizontal motor 28 moves auger trough 20 in a horizontal arcuate path, as indicated by the arrow designated 34. Together motors 24 and 28 are capable of locating end cap 22 in an unlimited number of locations to accommodate virtually any unloading condition.

Motors 24 and 28 are controlled from two operator stations. A rear station 36 is located for convenient control of unloading auger 14 while an operator is standing in proximity to unloading auger 14, while a tractor control station 38 is located within the towing tractor 12 for ease of control of the unloading process while in the protected area of the tractor cab and at a higher elevation to furnish an alternate viewing location. Tractor station 38 is connected to the other components of the control system by means of an electrical cable 40. Control stations 36 and 38 operate in conjunction with a solenoid valve assembly 42 to control motors 24 and 28, as is described in greater detail in association with FIG. 2.

Figure 2:
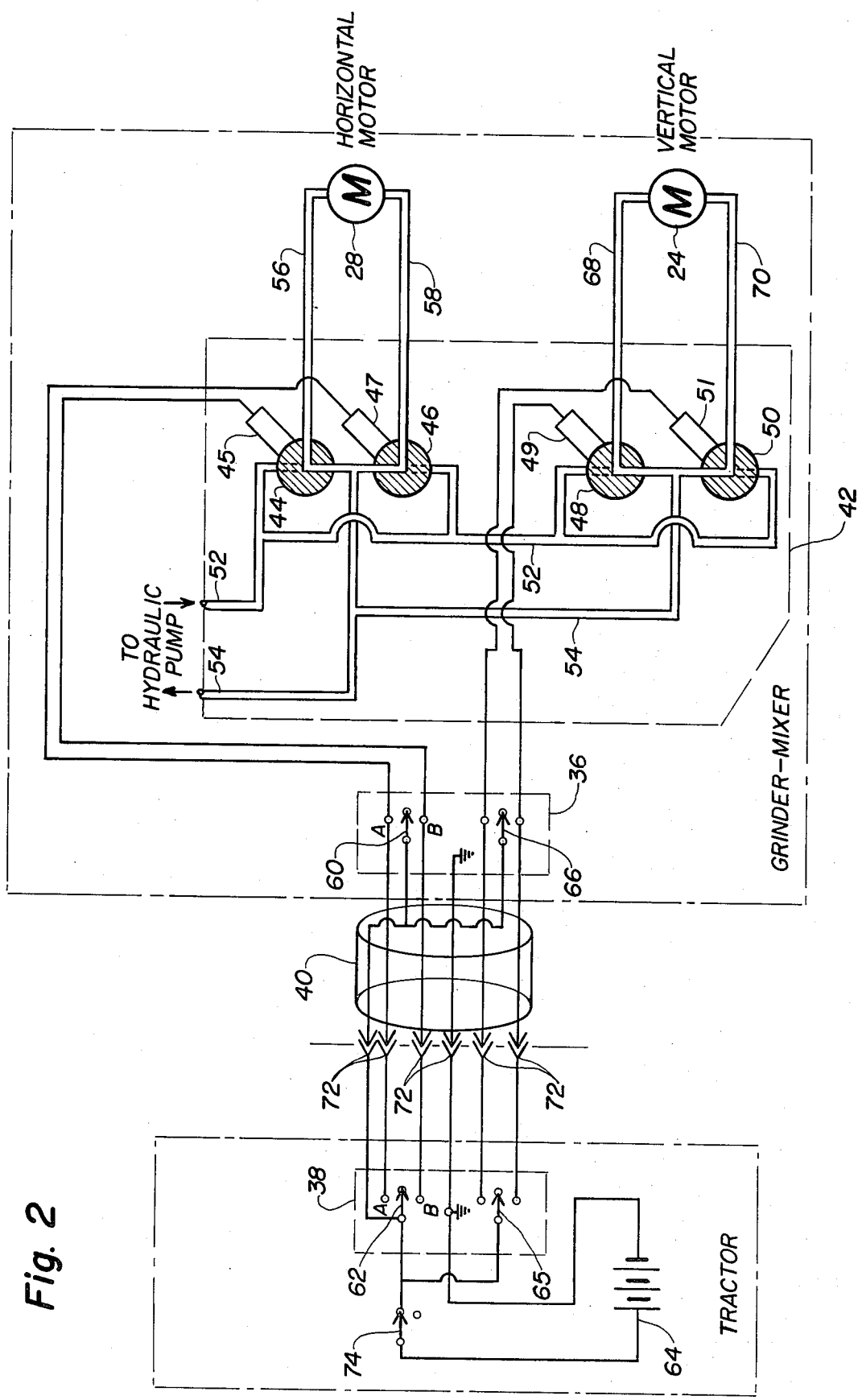
FIG. 2 is a schematic view illustrating an embodiment of the combined hydraulic and eletrical circuits preferred for the invention.

FIG. 2 is a schematic diagram combining both the hydraulic and electrical circuits of the preferred embodiment of the invention and showing the association of components relative to the tractor and the grinder-mixer.

Horizontal motor 28 and vertical motor 24, both powered hydraulically, are controlled by a plurality of electrically operated solenoid valves 44,46,48 and 50. The solenoid valves distribute pressurized hydraulic fluid from a well-known hydraulic pump (not shown) which can be located on either the tractor or the grinder-mixer, but in either case derives its power from the tractor engine. If located on the grinder-mixer, the pump is powered by mechanical connection to the power take off coupling of the tractor. A hydraulic line 52 supplies hydraulic fluid input to the valves and a line 54 returns fluid from the valves back to the pump.

Referring to motor 28 and valves 44 and 46, control of motor 28 is accomplished as follows: as shown in FIG. 2, motor 28 is deactivated since valves 44 and 46 are both actuated to cut off flow from input line 52 and a pair of hydraulic lines 56 and 58, connected to motor 28, are connected through valves 44 and 46 to return line 54. Motor 28 thus has no fluid flow through it, and no power is transmitted to it, so it is stationary.

When, for instance, a switch 60 or 62 is activated to an "A" position, connecting a tractor battery 64 to an electrical coil 47 of solenoid valve 46, valve 46 actuates and connects line 58 lto line 52 as is shown by a dotted line. Hydraulic fluid, and motive power, thus flows from line 52 through valve 46, line 58, motor 28, line 56, valve 44 and line 54 to return to the hydraulic pump.

When either switch 60 or 62 is moved to a "B" position, battery 64 connects to a coil 45, valve 44 is actuated and connects lines 52,56 as shown by dotted line, and the fluid flows instead from line 52, through valve 44, line 56, motor 28, and line 58 to return line 54. The motor rotation is thus reversed from the previous example, and the direction of movement of auger through 20 in horizontal plane 34 (FIG. 1) is also reversed.

A pair of solenoid valves 48 and 50, controlled by a pair of switches 65 and 66, and powered by coils 49 and 51, similarly control and reverse the fluid flow through a hydraulic line 68, vertical motor 24 and a hydraulic line 70, to control the vertical motion of auger trough 20.

An electrical connection 72 is used to connect the wires in cable 40 between tractor control station 38 and grinder-mixer control station 36. Tractor control station 38 also contains a main power switch 74 which disconnects electrical power between tractor battery 64 and switches 60 and 62 when the remote control system is not being used.

The present invention improves upon the motor powered orienting system for the unloading auger in that it furnishes controls at multiple locations which eliminates the need to move back and forth between the tractor and the unloading auger. This is accomplished by the use of electrically operated solenoid valves which controls each of the two hydraulic motors. One motor is used for raising the unloading auger and the other for rotating the auger in the horizontal plane. Two solenoid valves are used to control each motor and the direction of each motor is controlled by which valve is electrically operated. It is thus possible to control motor direction by simply applying electrical power to the appropriate valve.

The control station for the entire system thus becomes two simple single pole, double throw, center-off switches connected to the valves by, at most, six wires. With a simple control station such as that, connected by flexible wires as opposed to bulky, inflexible hydraulic lines, added control stations become extremely easy to arrange. All that is required for each additional control station is two more switches, connected in parallel with the first station. Connections for the additional hookup are furnished, and at least two stations are used. One is located in the tractor cab, detachable by a disconnecting plug and receptacle and the other is permanently mounted on the grinder-mixer near the base of the unloading auger.

These locations permit a single operator to direct the unloading auger from the tractor cab after initially moving the grinder-mixer into location and, later, while at the base of the unloading auger, without moving from one location to the other, also to better adjust the auger location.

It is to be understood that the form of the invention herein shown is merely a preferred embodiment. Various changes may be made in the size, shape and the arrangement of parts; equivalent means may be substituted for those illustrated and described; and certain features may be used independently from others without departing from the spirit and scope of the invention as defined in the following claims.

For example, powered rotation and vertical adjustment with similar remote controls can be used on the loading auger of grinder-mixers and additional electrical control stations can be added, by the use of additional parallel electrical circuits, to permit control of the location of the unloading auger from areas farther removed from the grinder-mixers, for instance the remote end of the unloading auger. Moreover, electrical motors can be used instead of hydraulic motors.

Having thus described the invention, what is claimed is:

1. In combination with a power source, a grinder-mixer including a mixing tank and an auger for unloading said mixing tank, the improvement comprising:
    (a) a first hydraulic motor for moving said auger in a generally vertical path;
    (b) a second hydraulic motor for moving said auger in a generally horizontal path;
    (c) a first pair of electric solenoid valves for operating said first hydraulic motor in order to move said auger in said generally vertical path;
    (d) a second pair of electric solenoid valves for operating said second hydraulic motor in order to move said auger in said generally horizontal path;
    (e) a first and a second electrical switch for controlling said first pair of electric solenoid valves;
    (f) a third and a fourth electrical switch for controlling said second pair of electric solenoid valves;
    (g) said first and third electrical switches being located on said grinder-mixer; and
    (h) said second and fourth electrical switches being located remote from said grinder-mixer on said power source.

2. The grinder-mixer of claim 1 wherein:
    (a) one of said first pair of electric solenoid valves is actuated to move said auger in one direction in said generally vertical path, and the other one of said first pair of electric solenoid valves is actuated to move said auger in the opposite direction in said generally vertical path; and
    (b) one of said second pair of electric solenoid valves is actuated to move said auger in one direction in said generally horizontal path, and the other one of said second pair of electric solenoid valves is actuated to move said auger in the opposite direction in said generally horizontal path.

3. The grinder-mixer of claim 1, wherein:
    (a) said first and second electrical switches are connected in parallel and each has two contacts so that activation of one of said two contacts actuates one of said first pair of electrical solenoid valves in order to operate said first hydraulic motor in a manner to move said auger in one direction in said generally vertical path while activation of the other one of said two contacts actuates the other one of said first pair of electric solenoid valves in order to operate said first hydraulic motor in a manner to move said auger in the opposite direction in said generally vertical path; and
    (b) said third and fourth electrical switches are connected in parallel and each has two contacts so that activation of one of said two contacts actuates one of said second pair of electric solenoid valves in order to operate said second hydraulic motor in a manner to move said auger in one direction in said generally horizontal path while activation of the other one of said two contacts actuates the other onen of said second pair of electric solenoid valves in order to operate said second hydraulic motor in a manner to move said auger in the opposite direction in said generally horizontal path.

4. The grinder-mixer of claim 1, wherein said first and third electrical switches comprise a control station located on said grinder-mixer, and said second and fourth electrical switches comprise another control station located remote from said grinder-mixer on said power source.

* * * * *